US011429672B2

(12) United States Patent
Ozaki et al.

(10) Patent No.: US 11,429,672 B2
(45) Date of Patent: Aug. 30, 2022

(54) DIALOGUE SERVER

(71) Applicant: NTT DOCOMO, INC., Chiyoda-ku (JP)

(72) Inventors: Yuriko Ozaki, Chiyoda-ku (JP); Hiroshi Fujimoto, Chiyoda-ku (JP); Takanori Hashimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/967,241

(22) PCT Filed: Dec. 28, 2018

(86) PCT No.: PCT/JP2018/048592
§ 371 (c)(1),
(2) Date: Aug. 4, 2020

(87) PCT Pub. No.: WO2019/187463
PCT Pub. Date: Oct. 3, 2019

(65) Prior Publication Data
US 2021/0034680 A1    Feb. 4, 2021

(30) Foreign Application Priority Data

Mar. 27, 2018 (JP) .............................. JP2018-060392

(51) Int. Cl.
*G06F 16/903* (2019.01)
*G06F 16/9032* (2019.01)
(Continued)

(52) U.S. Cl.
CPC .... *G06F 16/90344* (2019.01); *G06F 16/9017* (2019.01); *G06F 16/9035* (2019.01); *G06F 16/90332* (2019.01)

(58) Field of Classification Search
None
See application file for complete search history.

(56) References Cited

U.S. PATENT DOCUMENTS 8,825,620 B1 * 9/2014 Fliedner ............ G06F 16/90335
707/706
2009/0094232 A1 * 4/2009 Marvit .................. G06F 16/334
(Continued)

FOREIGN PATENT DOCUMENTS

| JP | 2000-137615 A | 5/2000 |
|---|---|---|
| JP | 2015-36945 A | 2/2015 |
| WO | WO 2016/103451 A1 | 6/2016 |

OTHER PUBLICATIONS

Japanese Office Action dated Jul. 6, 2021 in Japanese Patent Application No. 2020-509674 (with English translation), 6 pages.
(Continued)

*Primary Examiner* — Son T Hoang
(74) *Attorney, Agent, or Firm* — Oblon, McClelland, Maier & Neustadt, L.L.P.

(57) ABSTRACT

An object is to provide a dialogue server capable of removing an unnecessary keyword from a truth table.
A dialogue server 100 includes a truth table generation unit 105 extracting one or a plurality of keywords characterizing response content composed of a sentence on the basis of the response content and generating a truth table associating one or a plurality of keywords, from which an unnecessary keyword based on a predetermined condition is removed, of the one or the plurality of keywords, with the response content; a storage unit storing a truth table database 107; and an acquisition unit 102 searching for corresponding response content or a keyword for urging a user to make an additional input on the basis of the truth table database 107 upon reception of an input keyword from the user and transmitting the response content or the keyword to the user.

8 Claims, 8 Drawing Sheets

(51) Int. Cl.
*G06F 16/9035* (2019.01)
*G06F 16/901* (2019.01)

(56) References Cited

U.S. PATENT DOCUMENTS

| | | | |
|---|---|---|---|
| 2010/0057724 A1* | 3/2010 | Matsumura | G06F 16/3344 |
| | | | 707/E17.017 |
| 2011/0161071 A1* | 6/2011 | Duong-van | G06F 16/9535 |
| 2014/0188478 A1* | 7/2014 | Zhang | G06F 16/903 |
| 2014/0272884 A1* | 9/2014 | Allen | G06F 16/90 |
| 2016/0180242 A1* | 6/2016 | Byron | G06F 16/9035 |
| 2017/0004204 A1* | 1/2017 | Bastide | G06F 16/3329 |
| 2018/0089571 A1* | 3/2018 | Deluca | G06F 16/24 |
| 2019/0155904 A1* | 5/2019 | Santos Moraes | G06F 16/3329 |
| 2019/0286706 A1* | 9/2019 | Leydon | G06F 16/3337 |
| 2020/0183983 A1* | 6/2020 | Abe | G06F 16/90332 |

OTHER PUBLICATIONS

International Preliminary Report on Patentability and Written Opinion dated Oct. 8, 2020 in PCT/JP2018/048592 (submitting English translation only) 7 pages.

International Search Report dated Mar. 26, 2019 in PCT/JP2018/048592 filed on Dec. 28, 2018, 2 pages.

Hu, H. et al., "Chinese Automatic Question Answering System of Specific-domain Based on Vector Space Model," IEEJ Trans. EIS, vol. 125, No. 5, 2005, pp. 698-706, 13 total pages (with partial English translation).

* cited by examiner

DIALOGUE SERVER

TECHNICAL FIELD

The present invention relates to a dialogue server performing searching on the basis of an input key.

BACKGROUND ART

The following Patent Literature 1 discloses controlling an output of a response to a question included in a natural sentence, avoiding a risk of selecting a response that does not match an intention of a question of a client, and a question-response control program for efficiently performing processing of narrowing responses. Specifically, in this Patent Literature 1, in a case in which there are a predetermined number results or more when FAQ searching is performed, the number thereof is narrowed by asking a counter-question or a related question.

CITATION LIST

Patent Literature

[Patent Literature 1] Japanese Unexamined Patent Publication No. 2015-36945

SUMMARY OF INVENTION

Technical Problem

In Patent Literature 1, a tree structure is defined for combinations of a frequently asked question and a response thereto, and processing of selecting a counter-question is performed using the tree structure. Accordingly, there is a need to build a database for defining the tree structure, which takes considerable effort.

For this reason, a method of generating a truth table composed of question sentences and keywords configuring the question sentences and searching for a question sentence on the basis of an input key has been taken into consideration, but there are cases in which searching cannot be narrowed suitably depending on a keyword in the truth table. Therefore, there is a need to remove unnecessary keywords from the truth table. Removing unnecessary keywords manually is also conceivable. However, this may result in omissions in removal, and thus it is desired that removal be performed automatically.

Here, in order to resolve the problem described above, the present invention aims to provide a dialogue server capable of removing an unnecessary keyword from a truth table.

Solution to Problem

According to the present invention, there is provided a dialogue server responding to an input made by a user such that the user is urged to make an additional input and holding a dialogue by providing response content according to the input of the user. The dialogue server includes a generation unit configured to extract one or a plurality of keywords characterizing response content composed of a sentence on the basis of the response content and to generate a truth table associating one or a plurality of keywords, from which an unnecessary keyword based on a predetermined condition is removed, of the one or the plurality of keywords with the response content; a storage unit configured to store the truth table; and a search unit configured to search for corresponding response content or a return question keyword for urging the user to make an additional input on the basis of the truth table upon reception of an input keyword from the user and to transmit the response content or the return question keyword to the user.

According to this present invention, a useless return question can be prevented and the number of exchanges in such dialogue can be reduced by removing an unnecessary keyword.

Advantageous Effects of Invention

According to the present invention, a useless return question can be prevented and the number of exchanges in such dialogue can be reduced.

DESCRIPTION OF EMBODIMENT

An embodiment of the present disclosure will be described with reference to the accompanying diagrams. If possible, the same reference signs are applied to the same parts, and duplicate description will be omitted.

Figure 1:
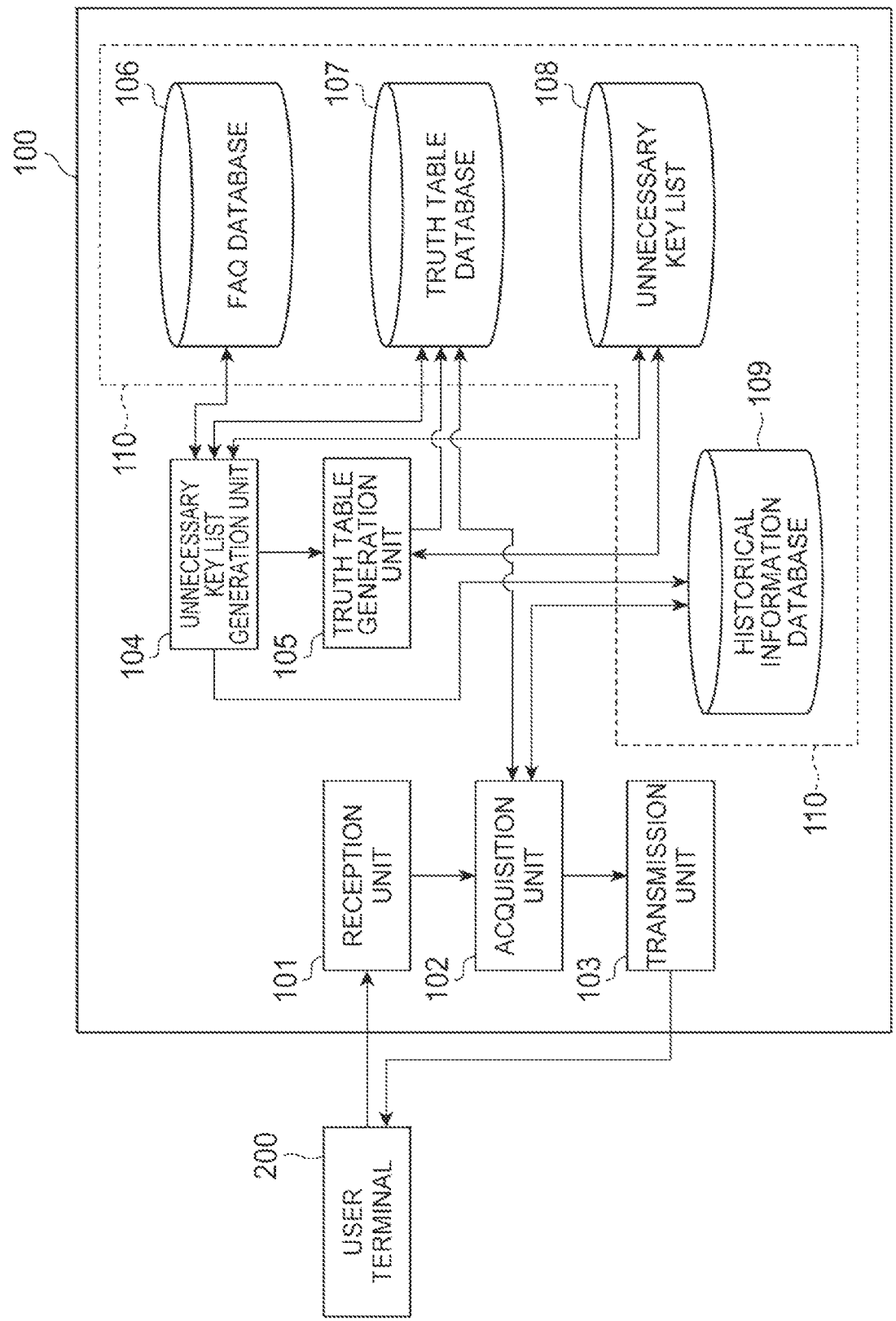
FIG. 1 is a block diagram showing a configuration of functions of a dialogue server 100 according to an embodiment of the present disclosure.

FIG. 1 is a block diagram showing a configuration of functions of a dialogue server 100 according to the embodiment of the present disclosure. The dialogue server 100 is a FAQ system which is configured to be able to communicate with a user terminal 200 and to provide a response to the user terminal 200 according to a query from the user terminal 200.

The dialogue server 100 determines a question sentence which a user desires by providing some question sentence candidates or a return question key (keyword) for narrowing the question sentence candidates before the question sentence which the user desires is determined in accordance with a keyword that is a query from the user terminal 200, and the dialogue server 100 provides a response corresponding to the question sentence to the user.

The dialogue server 100 is configured to include a reception unit 101, an acquisition unit 102 (search unit), a transmission unit 103, an unnecessary key list generation unit 104, a truth table generation unit 105 (generation unit), a FAQ database 106, a truth table database 107, an unnecessary key list 108, and a historical information database 109. The FAQ database 106, the truth table database 107, the unnecessary key list 108, and the historical information database 109 are stored in a storage unit 110.

The reception unit 101 is a part for receiving an input sentence for a query input to the user terminal 200. Furthermore, the reception unit 101 receives a return question key which is transmitted by the transmission unit 103 and intention information which indicates an intention of affirmation/negation. with respect to the question sentence candidates.

The acquisition unit 102 is a part for extracting a keyword (input key) from an input sentence received by the reception unit 101 using a known natural language algorithm such as morphological analysis. Moreover, the acquisition unit 102 acquires question sentence candidates according to the input key or a return question key for narrowing the question sentence candidates with reference to the truth table database 107 and delivers the candidates or the key to the transmission unit 103.

In addition, when the reception unit 101 receives intention information with respect to a return question key, the acquisition unit 102 acquires question sentence candidates based on the return question key and the intention information or an additional return question key for narrowing the question sentence candidates and delivers the candidates or the key to the transmission unit 103.

In addition, the acquisition unit 102 registers an input key or a return question key in the historical information database 109.

The transmission unit 103 transmits question sentence candidates or a return question key for narrowing the question sentence candidates to the user terminal 200. The user terminal 200 can gradually narrow the question sentence candidates by transmitting the question sentence candidates or intention information with respect to a return question key.

The unnecessary key list generation unit 104 is a part for generating an unnecessary key list at a timing set in advance. For example, this timing is a time when the FAQ system is in operation, a case in which historical information has been accumulated for a predetermined period of time, a time when an operator conducts an operation, or the like. The unnecessary key list is a list of keywords which are determined as unnecessary keywords when the acquisition unit 102 narrows question sentence candidates with reference to the truth table database 107.

For example, even in a case in which one keyword in the truth table database 107 is removed, when one question sentence can be determined using a different keyword, the unnecessary key list generation unit 104 registers the one keyword in the unnecessary key list as an unnecessary keyword. Since a keyword which is included in all of the question sentences does not contribute to narrowing the question sentences, such a keyword is registered in the unnecessary key list.

In addition, the unnecessary key list generation unit 104 may generate an unnecessary key list on the basis of the parts of speech. A keyword corresponding to a part of speech set in advance is registered in the unnecessary key list. Pronouns such as "this" are registered in the unnecessary key list.

In addition, the unnecessary key list generation unit 104 may generate an unnecessary key list on the basis of a frequency of appearance in the truth table database 107 or a degree of importance of a TF-IDF or the like. For example, it is possible to determine that a keyword of a high frequency of appearance is meaningless to narrowing the question sentence candidates, and thus such a keyword is registered in the unnecessary key list. In addition, the TF-IDF is computed for each keyword in the truth table database 107, and a keyword determined as having a low degree of importance is registered in the unnecessary key list.

In addition, the unnecessary key list generation unit 104 may generate an unnecessary key list on the basis of the historical information stored in the historical information database 109. For example, when the user expresses an intention of skipping or an intention of negation with respect to a return question key, the unnecessary key list generation unit 104 registers a keyword corresponding to the return question key in the unnecessary key list. An intention of skipping indicates a request for next processing (for example, transmission of a next return question key) without determination of affirmation or negation with respect to a return question key. In addition, when the unnecessary key list generation unit 104 locates a question sentence with reference to the historical information database 109, an unused keyword may be extracted from the truth table database 107 and may be registered in the unnecessary key list.

The truth table generation unit 105 is a part for acquiring a keyword by performing language analysis processing, such as morphological analysis, of the question sentences listed in the FAQ database 106 and generating the truth table database 107. In addition, the truth table generation unit 105 is a part for removing the keywords stored in the unnecessary key list 108 (so-called unnecessary keys) from the truth table database 107 in accordance with a timing set in advance or an operation by the operator and generating a truth table in which unnecessary keys are removed.

The FAQ database 106 is a database for performing FAQ processing of searching for a question sentence with respect to a key input. In this FAQ database 106, one or a plurality of keywords for performing searching, question sentences (sentences) corresponding the keywords, and responses thereto are listed.

In the truth table database 107, one or a plurality of keywords for performing searching and question sentences corresponding to the keywords are listed. This truth table database 107 has been generated by performing known language analysis processing, such as morphological analysis, of the question sentences and the responses of the FAQ database 106. The acquisition unit 102 acquires a corresponding question sentence or an additional return question key with reference to the truth table database 107 on the basis of the input key received by the reception unit 101 or an intention corresponding to the return question key. Moreover, as necessary, a response corresponding to the question sentence is obtained from the FAQ database 106. The truth table database 107 and the FAQ database 106 may be synthesized as one database.

The unnecessary key list 108 is a part for listing unnecessary keys generated by the unnecessary key list generation unit 104.

The historical information database 109 is a part for storing historical information which is information given and taken between the user terminal 200 and the dialogue server 100. Specifically, in the historical information database 109, input keys or return question keys which are acquired by the acquisition unit 102 and intentions of the user with respect to the keys are listed.

Figure 2:
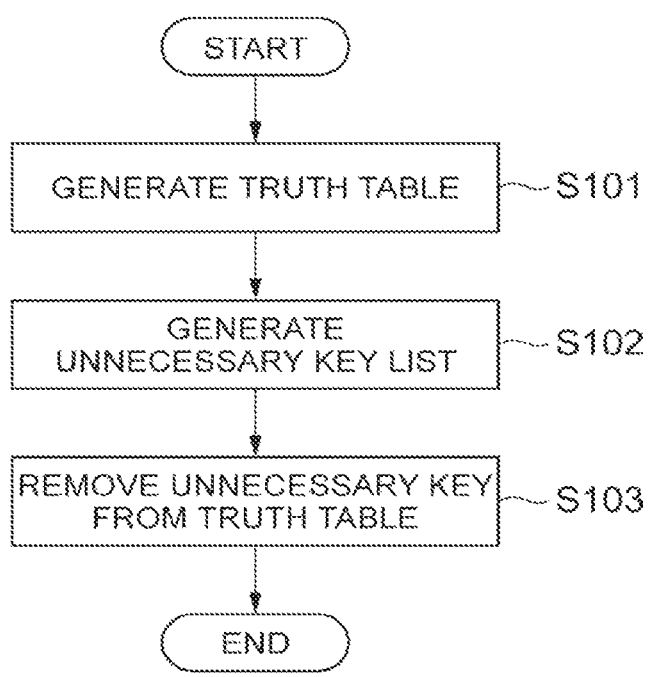
FIG. 2 is a flowchart showing processing of generating an unnecessary key from a truth table.

Next, processing of the dialogue server 100 having such a configuration will be described. FIG. 2 is a flowchart showing processing of generating an unnecessary key from a truth table. First, the truth table generation unit 105 generates the truth table database 107 on the basis of the FAQ database 106 (S101). As described above, the truth table generation unit 105 acquires one or a plurality of keywords for performing searching by performing morphological analysis of the question sentences and the responses of the FAQ database 106, and the truth table generation unit 105 generates the truth table database 107 by performing processing of mapping the acquired keys to responses.

The unnecessary key list generation unit 104 generates the unnecessary key list 108 from the truth table database 107 (S102). As described above, a searching keyword, of the searching keywords stored in the truth table database 107, without which question sentences can be narrowed uniquely even if the searching keyword is removed is considered not to contribute to narrowing the question sentences and thus is registered in the unnecessary key list 108.

The truth table generation unit 105 removes an unnecessary key (keyword) listed in the unnecessary key list 108 generated by the unnecessary key list generation unit 104 from the truth table database 107 (S103). Thereafter, the acquisition unit 102 executes processing for a FAQ (processing of acquiring question sentence candidates or a return question key) with reference to the truth table database 107 from which an unnecessary key is removed.

Figure 6:
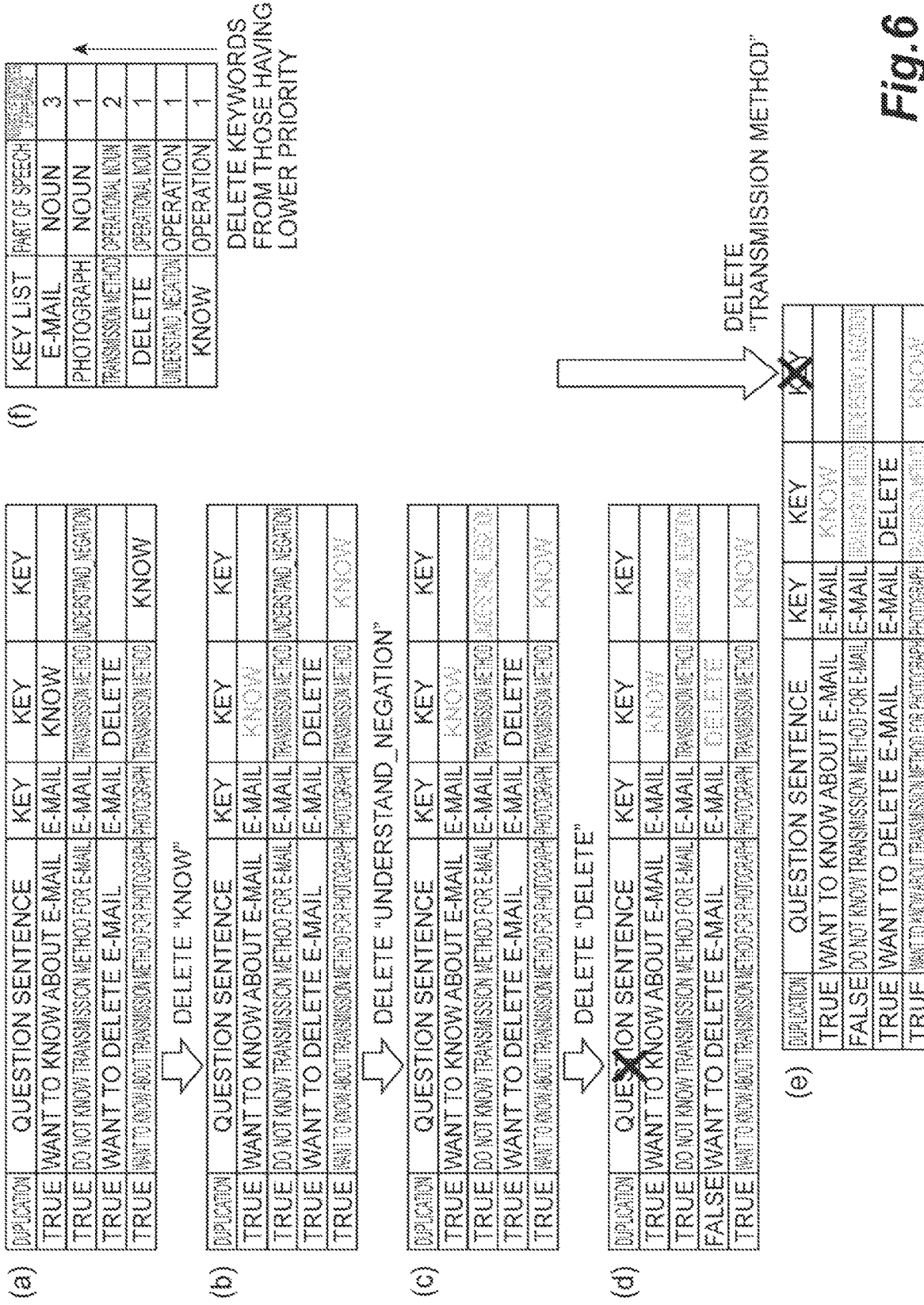
FIG. 6 is a conceptual diagram showing a specific structure for generating an unnecessary key list.

Here, using FIG. 6, a specific structure for generating an unnecessary key list will be described. FIGS. 6(a) to 6(e) are transition diagrams for determining the degree of narrowing question sentences when a keyword is removed in order to sort an unnecessary key. The columns of "duplication" (left column) are columns indicating whether or not narrowing can be performed. One or a plurality of keywords including at least one different keyword are associated with the question sentence marked with TRUE in the duplication column, thereby indicating that the question sentence is able to be narrowed. Meanwhile, the exact same keyword is associated with the question sentence in which FALSE is listed, thereby indicating that the question sentence is not able to be narrowed.

FIG. 6(a) shows an initial state of the truth table database 107. FIG. 6(b) shows a state when a keyword "know" is deleted from the truth table database 107 from the initial state. In FIG. 6(b), since the question sentences have combinations of different keywords, each of the question sentences can be narrowed using the different keywords. Thus, TRUE is marked in the duplication column for all of the question sentences. Accordingly, the keyword "know" becomes an unnecessary keyword in narrowing the question sentences and thus is registered in the unnecessary key list 108.

It is favorable that keywords to be deleted be deleted from those having lower priority, but the configuration is not limited thereto. FIG. 6(f) shows the priority of the keywords, and detailed description will be given below.

FIG. 6(c) shows a state when a keyword "understand_negation" is deleted further. The keyword "understand_negation" indicates "do not understand" and is a result of the negative form of "understand" which has been generalized or encoded. In this state as well, since the question sentences have combinations of different keywords, each of the question sentences can be narrowed using the different keywords. Thus, TRUE is marked in the duplication columns for all of the question sentences. Accordingly; the keyword "understand_negation" becomes an unnecessary key and thus is registered in the unnecessary key list 108.

FIG. 6(d) shows a state when a keyword "delete" is deleted further. Here, the same keyword "e-mail" is associated with "want to know about e-mail" and "want to delete e-mail". Further, FALSE is marked in the duplication column of the question sentence "want to delete e-mail" from which the keyword "delete" is deleted, and an error is marked. Accordingly, since "delete" is a keyword necessary to uniquely narrow the question sentences, it is not registered in the unnecessary key list 108.

FIG. 6(e) shows a state when a keyword "transmission method" is deleted from the state in FIG. 6(c). Since the question sentences cannot be uniquely narrowed here in a similar manner, the keyword "transmission method" is not registered in the unnecessary key list 108.

FIG. 6(f) is a key list indicating a deletion order. This list is generated on the basis of the number of appearances in the truth table. In the present disclosure, it is determined that keywords having a fewer number of appearances have lower priority so that keywords are deleted from those having lower priority and it is determined whether or not the keywords are unnecessary keys. The determination method is not limited to a method of determining whether or not the keywords are unnecessary keys from keywords having a fewer number of appearances, and it may be determined whether or not the keywords are unnecessary keys by deleting the keywords in accordance with a different standard.

In this manner, an unnecessary key list can be generated on the basis of the truth table database 107.

Figure 3:
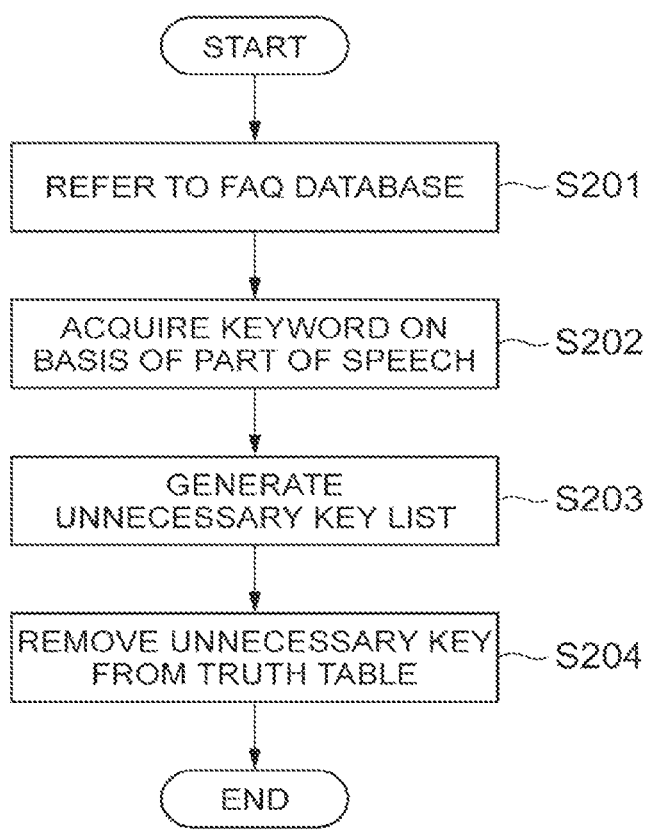
FIG. 3 is a flowchart showing processing at the time of generating an unnecessary key list on the basis of the parts of speech or frequencies of appearance.

Next, with reference to a FAQ database (question sentences), processing at the time of acquiring unnecessary keywords on the basis of the parts of speech, the frequencies of appearance, or the like will be described. FIG. 3 is a flowchart showing processing at the time of generating an unnecessary key list on the basis of the parts of speech or frequencies of appearance.

The unnecessary key list generation unit 104 refers to the FAQ database 106 (S201) and acquires a keyword which is an unnecessary key on the basis of the part of speech and the frequency of appearance (S202). The unnecessary key list generation unit 104 generates the unnecessary key list 108 from the acquired unnecessary key (S203).

The truth table generation unit 105 removes the keyword of the unnecessary key list 108 from the truth table database 107 (S204).

In this manner, keywords such as pronouns which are not utilized in searching can be removed from the truth table database 107 by deter ruining unnecessary keys on the basis of the parts of speech and the frequencies of appearance of the keywords stored in the FAQ database 106. The parts of speech to be regarded as unnecessary keys are set in advance. For example, the unnecessary key list generation unit 104 stores information indicating that pronouns are unnecessary.

Figure 4:
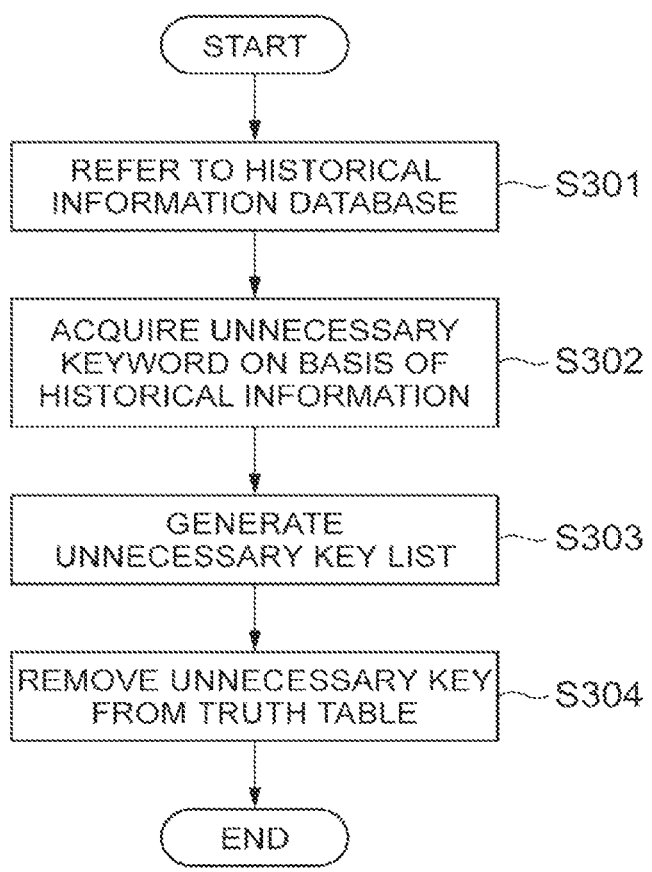
FIG. 4 is a flowchart showing processing at the time of generating the unnecessary key list 108 on the basis of a historical information database 109.

Next, processing at the time of generating the unnecessary key list 108 on the basis of the historical information database 109 will be described. FIG. 4 is a flowchart showing processing at that time. The unnecessary key list 108 is generated using this historical information after FAQ searching is performed for a predetermined period of time or a predetermined number of times. Thus, here, the truth table database 107 is reconstituted on the basis of the historical information.

The unnecessary key list generation unit 104 refers to the historical information database 109 (S301) and acquires an unnecessary keyword on the basis of the historical information (S302). For example, when a return question key is skipped, a keyword corresponding to the return question key is regarded as an unnecessary keyword. In addition, as a result of searching, an unused keyword may be regarded as an unnecessary keyword. The unnecessary key list generation unit 104 generates the unnecessary key list 108 on the basis of the acquired keywords (S303).

The truth table generation unit 105 removes a keyword listed in the unnecessary key list 108 from the truth table database 107 (S304). Thereafter, the acquisition unit 102 performs FAQ processing based on the truth table database 107.

In this manner, keywords which are not actually utilized in searching can be removed from the truth table database 107 by deter mining an unnecessary key on the basis of the historical information database 109.

Figure 5:
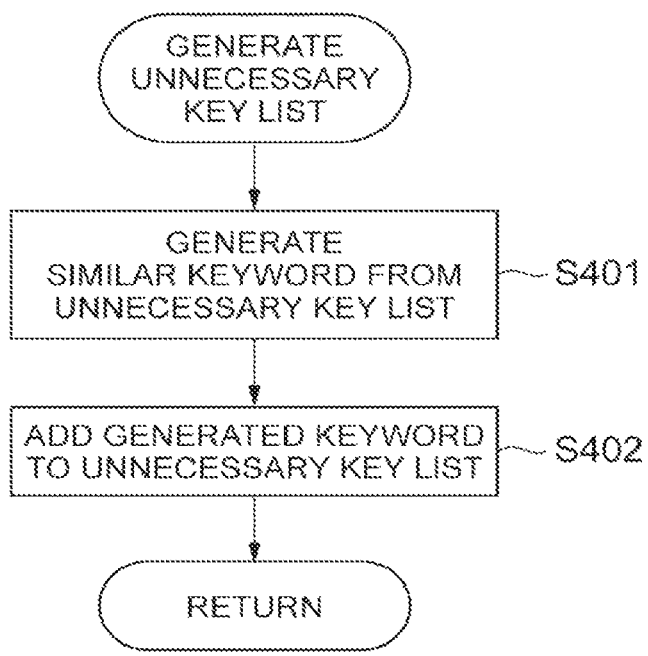
FIG. 5 is a flowchart showing processing at the time of removing an unnecessary key from a truth table database 107 on the basis of the extended unnecessary key list 108.

Next, processing at the time of removing an unnecessary key from the truth table database 107 on the basis of the extended unnecessary key list 108 will be described. FIG. 5 is a flowchart showing processing at that time. The processing in FIG. 5 can also be applied to the processing of generating an unnecessary key list in FIGS. 2 to 4.

The unnecessary key list generation unit 104 generates the unnecessary key list 108 in accordance with the processing shown in FIGS. 2 to 4. That is, the unnecessary key list 108 is generated on the basis of the historical information, the truth table database 107, the parts of speech, the frequencies of appearance, and the like. Moreover, the unnecessary key list generation unit 104 generates a keyword similar to each of the unnecessary keys of the unnecessary key list 108 (S401). For example, the unnecessary key list generation unit 104 uses a language analysis algorithm, such as Word-2-Vector (W2V), when a keyword similar to an unnecessary key is generated. The unnecessary key list generation unit 104 vectorizes an unnecessary key and acquires a different keyword close to the vector as a similar keyword. An acquisition source of the similar keyword is general documents, websites, and a database in which sentences are listed.

The unnecessary key list generation unit 104 registers the similar keyword in the unnecessary key list 108 (S402).

In this manner, a keyword similar to an unnecessary key also becomes a removal target, and therefore the extended unnecessary key list 108 can be generated.

Figure 7:
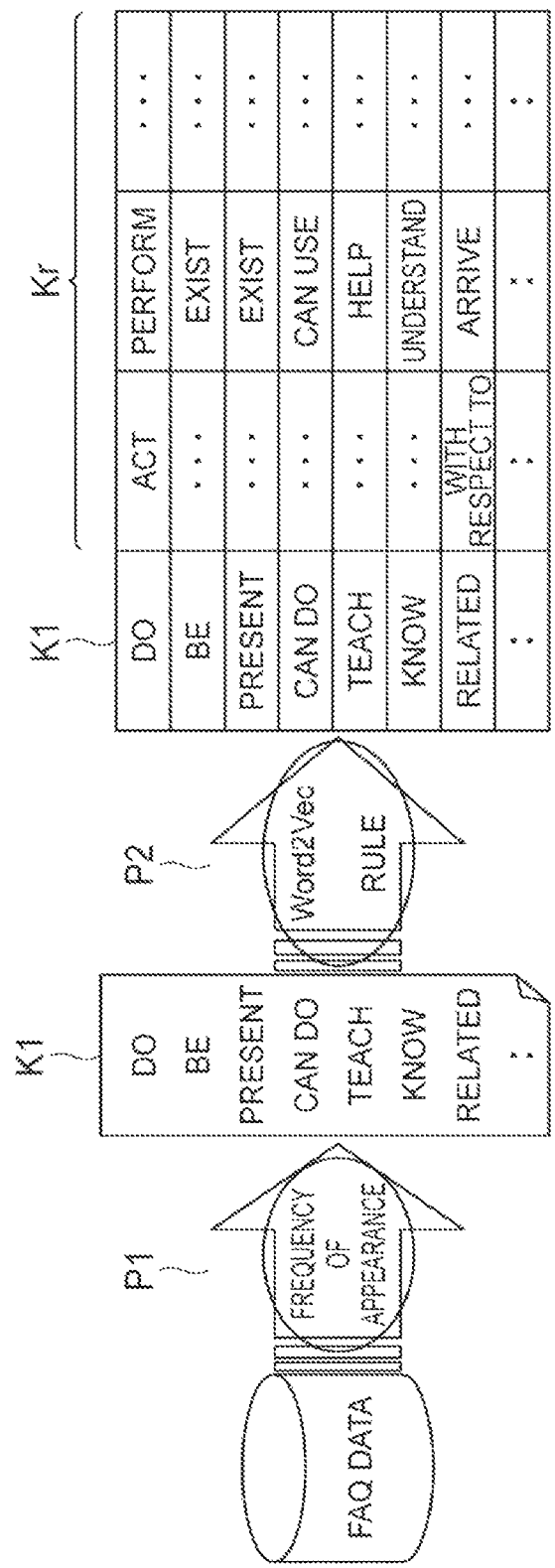
FIG. 7 is a diagram showing a process of processing at the time of extending an unnecessary key list.

FIG. 7 is a diagram showing a process of processing at the time of extending an unnecessary key list. First, the unnecessary key list generation unit 104 acquires the frequency of appearance of each of the keywords from the FAQ database 106 (processing P1). Further, a keyword group K1 including keywords of a predetermined frequency or higher or keywords of high-ranked frequencies are extracted. This keyword group K1 is subjected to processing P2 for extracting similar keywords. For example, this processing P2 is Word-2-Vector (W2V). Consequently, a keyword group Kr having keywords similar to the keywords of the keyword group K1 are extracted. In FIG. 7, for example, similar keywords "act" and "perform" are acquired for a keyword "do".

In this manner, the unnecessary key list can be extended by acquiring the similar keywords and adding the similar keywords to the unnecessary key list 108. That is, since a keyword similar to an unnecessary keyword is also an unnecessary keyword, it is favorable that such an unnecessary keyword be added to the unnecessary key list 108, but the configuration is not limited thereto.

Next, operational effects of the dialogue server 100 according to the embodiment of the present disclosure will be described. The dialogue server 100 of the present embodiment is a device transmitting a return question key which is a response to an input made by the user such that the user is urged to make an additional input and holding a dialogue by providing a question sentence which is response content according to the input of the user.

This dialogue server 100 includes the truth table generation unit 105 extracting one or a plurality of keywords characterizing a question sentence (response content composed of a sentence) listed in the FAQ database 106 on the basis of the question sentence and generating a truth table associating one or a plurality of keywords, from which an unnecessary keyword based on a predetermined condition is removed, of one or a plurality of keywords, with the question sentences; a storage unit storing the truth table database 107; the acquisition unit 102 searching for a corresponding question sentence or a return question keyword for urging the user to make an additional input on the basis of the truth table database 107 upon reception of an input keyword from the user; and the transmission unit 103 transmitting the question sentence or the return question keyword to the user.

According to this dialogue server 100, a useless return question can be prevented and the number of exchanges in dialogue can be reduced by removing an unnecessary keyword. For example, an unnecessary keyword is a keyword of which a search result cannot be narrowed even if searching is performed for. When such a keyword is included in the truth table, return question processing may be performed on the basis thereof, but a search result cannot be narrowed even if a return question is asked with this keyword. Accordingly, reduction of the number of exchanges in dialogue is promoted by removing such an unnecessary keyword from the truth table database 107. In addition, an effect in that processing efficiency of the dialogue server 100 can be improved is exhibited. That is, since a dialogue is not unnecessarily continued, a processing load of the dialogue server 100 is reduced. Thus, processing efficiency for the dialogue can be improved. In addition, since unnecessary keywords are not stored, use efficiency of a memory can be improved.

In addition, in the dialogue server 100 of the present embodiment, when each of the question sentences (response content) can be uniquely judged in the truth table database 107 in which one or a plurality of keywords of the extracted keywords are removed, the truth table generation unit 105 generates the truth table database 107 in which the keywords are removed as unnecessary keywords.

According to this dialogue server 100, a useless return question can be prevented and the number of exchanges in dialogue can be reduced by causing a keyword without which a question sentence response content) can be uniquely judged even if the keyword is removed to be regarded as an unnecessary key.

In addition, in the dialogue server 100 of the present embodiment, the truth table generation unit 105 determines whether or not one or a plurality of extracted keywords are removal targets on the basis of the degree of importance thereof and generates the truth table database 107.

According to this dialogue server 100, the truth table database 107 is generated in accordance with the degree of importance of keywords. For example, a useless return question is prevented and the number of exchanges in dialogue is reduced by generating the truth table database 107 on the basis of the parts of speech and FAQs, the frequencies of appearance or the TF-IDF in the truth table, or the like.

In addition, in the dialogue server 100 of the present embodiment, the truth table generation unit 105 generates the truth table database 107 in which a keyword, of one or a plurality of extracted keywords, similar to an unnecessary keyword based on the predetermined condition is removed.

According to this dialogue server 100, the truth table database 107 in which similar keywords are also removed as unnecessary keys can be generated. Thus, a useless return question is prevented, and it is possible to contribute to reduction of the number of exchanges in dialogue.

In addition, the dialogue server 100 of the present embodiment further includes the historical information database 109 in which keywords input by the user are listed as the historical information. The truth table generation unit 105 generates a new truth table database 107 in which a keyword, of the keywords listed in the truth table database 107, not included in the historical information is removed as an unnecessary key.

According to this dialogue server 100, the accuracy of the truth table database 107 can be improved by removing an unnecessary key on the basis of the historical information. That is, it is possible to determine that a keyword which is not used in FAQ searching is an unnecessary keyword. Thus, a useless return question can be prevented and the number of exchanges in dialogue can be reduced by removing the unnecessary keyword.

In addition, the dialogue server 100 of the present embodiment further includes a history storage unit storing a return question keyword for urging the user to make art additional input and an intention of the user with respect to the return question keyword as historical information. The truth table generation unit 105 generates a truth table in which a return question keyword satisfying the predetermined condition with an intention of the user is removed as an unnecessary key.

According to this dialogue server 100, the accuracy of the truth table can be improved by removing an unnecessary key on the basis of the historical information. Thus, a useless return question can be prevented and the number of exchanges in dialogue can be reduced.

In addition, the dialogue server 100 of the present embodiment further includes the unnecessary key list generation unit 104 generating an unnecessary key list including candidates for an unnecessary keyword based on the predetermined condition from one or a plurality of keywords. This unnecessary key list generation unit 104 generates the truth table database 107 on the basis of the unnecessary key list.

According to this dialogue server 100, a keyword can be removed easily by generating the unnecessary key list. In addition, the unnecessary key list is extended easily such that similar keywords are included on the basis of the unnecessary key list.

The block diagrams used in description of the foregoing embodiment indicate blocks in units of function. The functional blocks (configuration units) are realized in an arbitrary combination of hardware and/or software. In addition, means for realizing each of the functional blocks is not particularly limited. That is, each of the functional blocks may be realized by one device which is physically and/or logically coupled and may be realized by two or more devices which are physically and/or logically separated from each other by connecting the plurality of devices to each other directly and/or indirectly (for example, through a cable and/or by radio).

Figure 8:
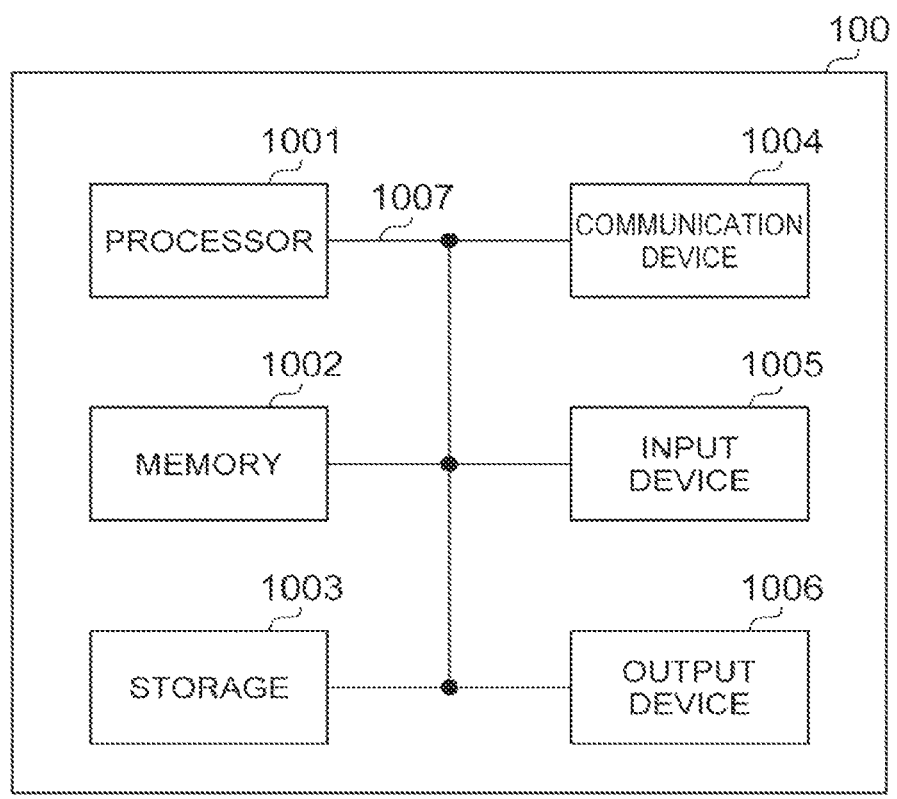
FIG. 8 is a diagram showing an example of a hardware configuration of the dialogue server 100 according to the present embodiment.

For example, the dialogue server 100 according to the embodiment of the present invention may function as a computer performing processing of the dialogue server 100 of the present embodiment. FIG. 8 is a diagram showing an example of a hardware configuration of the dialogue server 100 according to the present embodiment. The dialogue server 100 described above may be physically configured as a computer device including a processor 1001, a memory 1002, a storage 1003, a communication device 1004, an input device 1005, an output device 1006, a bus 1007, and the like.

In the following description, the wording "device" can be reworded as a circuit, a device, a unit, or the like. The hardware configuration of the dialogue server 100 may be configured to include one or a plurality of devices shown in the diagrams or may be configured without including some devices.

Each of the functions in the dialogue server 100 is realized by causing predetermined software (program) to be read in hardware such as the processor 1001 or the memory 1002 such that the processor 1001 performs arithmetic operation, and by controlling communication using the communication device 1004 and reading and/or writing of data in the memory 1002 and the storage 1003.

For example, the processor 1001 controls the computer in its entirety by operating an operating system. The processor 1001 may be configured as a central processing unit (CPU) including an interface for peripheral devices, a controller, an arithmetic unit, a register, and the like. For example, the unnecessary key list generation unit 104, the truth table generation unit 105, and the like described above may be realized by the processor 1001.

In addition, the processor 1001 reads a program (program code), a software module, and data from the storage 1003 and/or the communication device 1004 into the memory 1002 and executes various kinds of processing in accordance therewith. Regarding the program, a program causing the computer to execute at least a part of the operation described in the foregoing embodiment is used. For example, the dialogue server 100 may be realized by a control program which is stored in the memory 1002 and operates in the processor 1001, and other functional blocks may also be realized similarly. A case in which various kinds of processing described above are executed by one processor 1001 has been described, but they may be executed simultaneously or sequentially by two or more processors 1001. The processor 1001 may be mounted in one or more chips. The program may be transmitted from a network via an electric communication circuit.

The memory 1002 is a computer-readable recording medium. For example, it may be configured to be at least one of a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can retain a program (program code), a software module, and the like which can be executed to perform a radio communication method according to the embodiment of the present invention.

The storage 1003 is a computer-readable recording medium. For example, it may be configured to he at least one of an optical disc such as a compact disc ROM (CD-ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. For example, the storage medium described above may he a database including the memory 1002 and/or the storage 1003, a server, or other suitable mediums.

The communication device 1004 is hardware (transceiver device) for performing communication between computers through a cable and/or via a radio network. For example, it is also referred to as a network device, a network controller, a network card, a communication module, or the like. For example, the reception unit 101, the transmission unit 103, and the like described above may be realized by the communication device 1004.

The input device 1005 is an input device (for example, a keyboard, a mouse, a microphone, a switch, a button, or a sensor) receiving an input from the outside. The output device 1006 is an output device (for example, a display, a speaker, or an LED lamp) performing an output to the outside. The input device 1005 and the output device 1006 may be configured to be an integrated body (for example, a touch panel).

In addition, the devices, such as the processor 1001 and the memory 1002, are connected to each other using the bus 1007 for communication of information. The bus 1007 may be configured to be a single bus or may be configured to be separate buses between devices.

In addition, the dialogue server 100 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be mounted in at least one of the units of hardware.

Hereinabove, the embodiment of the present disclosure has been described in detail, and it is apparent to those skilled in the art that the present embodiment is not limited to the embodiment described in this specification. The present embodiment can be performed in modified and altered forms without departing from the gist and the scope of the present invention defined by description in the claims. Accordingly, this specification has been described for the purpose of exemplary explanation and does not have any restrictive meaning for the present embodiment.

Notification of information is not limited to the aspects/embodiment described in this specification and may be performed using other methods. For example, notification of information may be performed by physical layer signaling (for example, downlink control information (DCI) or uplink control information (UCI)), upper layer signaling (for example, radio resource control (RRC), medium access control (MAC) signaling, notification information (master information block (MIB) or system information block (SIB))), other signals, or combinations thereof. In addition, the RRC signaling may be referred to as an RRC message. For example, it may also be an RRC connection setup message, an RRC connection reconfiguration message, or the like.

The aspects/embodiment described in this specification may be applied to systems utilizing Long Term Evolution (LTE), LTE-Advanced (LTE-A), SUPER 3G, IMT-Advanced, 4G, 5G, future radio access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-wideband (UWB), Bluetooth (registered trademark), or other suitable systems and/or next-generation systems which are extended on the basis thereof.

The order of processing procedures, the sequences, the flowcharts, and the like of the aspects/embodiment described in this specification may be switched as long as there is no inconsistency. For example, in the methods described in this specification, elements of various steps are presented in an exemplary order, and the methods are not limited to any particular orders which have been presented.

The input and output information or the like may be retained in a particular place (for example, a memory) or may be managed using a management table. The input and output information or the like may be overwritten, updated, or added. The output information or the like may be deleted. The input information or the like may be transmitted to a different device.

Judging may be performed using a value (0 or 1) which is expressed in one bit, may be performed using a Boolean value (true or false), or may be performed through comparison of numerical values (for example, comparison with a predetermined value).

The aspects/embodiment described in this specification may be used alone, may be used in combination, or may be switched upon execution thereof. In addition, notification of predetermined information (for example, notification of "being X") is not limited to explicit notification and may be performed through implicit notification (for example, the predetermined information is not notified).

Regardless of whether it is called software, firmware, middleware, micro-codes, hardware description language, or other names, software should be widely interpreted such that it means instructions, an instruction set, codes, code segments, program codes, a program, a sub program, a software module, an application, a software application, a software package, a routine, a sub routine, an object, an executable file, an execution thread, a procedure, a function, or the like.

In addition, software, instructions, and the like may be transceived via a transmission medium. For example, when software is transmitted from a website, a server, or a different remote resource using a wired technology such as a coaxial cable, an optical fiber cable, a twisted-pair wire, or a digital subscriber line (DSL) and/or a wireless technology such as infrared rays, radio waves, or microwaves, the wired technology and/or the wireless technology are included in the definition of the transmission medium.

Information, signals, and the like described in this specification may be expressed using any of various different technologies. For example, data, an instruction, a command, information, a signal, a bit, a symbol, and a chip which can be mentioned throughout the foregoing description in its entirety may be expressed by a voltage, a current, electromagnetic waves, a magnetic field or magnetic particles, a photo field or photons, or an arbitrary combination thereof.

The terms described in this specification and/or the terms required to understand this specification may be substituted with terms having the same or similar meanings.

The terms "system" and "network" are used compatibly in this specification.

Information, parameters, and the like described in this specification may be expressed by absolute values, may be expressed by values relative to predetermined values, or may be expressed by other corresponding information. For example, radio resources may be indicated by indices.

There are cases in which a user terminal is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

There are cases in which the term "determination" or "determining" used in this specification includes various kinds of operations. For example, the term "determination" or "determining" may include cases in which judging, calculating, computing, processing, deriving, investigating, looking up (for example, looking up in a table, a database, or another data structure), and ascertaining are regarded as "determination" or "determining". In addition, the term "determination" or "determining" may include cases in which receiving (for example, receiving information), transmitting (for example, transmitting information inputting, outputting, and accessing (for example, accessing data in a memory) are regarded as "determination" or "determining". In addition, the term "determination" or "determining" may include cases in which resolving, selecting, choosing, establishing, and comparing are regarded as "determination" or "determining". That is, the term "determination" or "determining" may include cases in which a certain operation is regarded as "determination" or "determining".

The term "connected", "coupled", or all sorts of modifications thereof mean all sorts of direct or indirect connection or coupling between two or more elements and can include cases in which one or more intermediate elements are present between two elements which are "connected" or "coupled" to each other. Coupling or connection between elements may be conducted physically, logically, or in a combination thereof. When the term is used in this specification, it is conceivable that two elements be "connected" or "coupled" to each other by using one or more electric wires, cables, and/or an electrically printed connection, and by using electromagnetic energy such as electromagnetic energy having wavelengths of a radio frequency region, a microwave region, and a light (both visible and invisible) region as some non-limited and non-comprehensive examples.

The expression "on the basis of" used in this specification does not mean "on the basis of only" unless otherwise specified. In other words, the expression "on the basis of" means both "on the basis of only" and "on the basis of at least".

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

When the terms "include," "including," and modifications thereof are used in this specification or the appended claims, the terms are intended to have a comprehensive meaning similar to the term "comprising". The term "or" which is used in this specification or the claims is not intended to mean an exclusive logical sum.

In this specification, a singular term includes plural forms unless only one is mentioned to be apparent in context or technically.

REFERENCE SIGNS LIST

100 Dialogue server
101 Reception unit
102 Acquisition unit
103 Transmission unit
104 Unnecessary key list generation unit
105 Truth table generation unit
106 FAQ database
107 Truth table database
108 Unnecessary key list
109 Historical information database
110 Storage unit
200 User terminal

The invention claimed is:

1. A dialogue server comprising:
a memory configured to store a response content including a response content composed of a sentence; and
processing circuitry configured to:
extract a plurality of keywords characterizing the response content by performing natural language analysis processing on the response content;
generate a truth table associating one or more of the plurality of keywords with the response content, wherein an unnecessary keyword based on a predetermined condition is removed from the plurality of keywords;
store the truth table in the memory;
search for corresponding response content keyword or a return question keyword based on the truth table upon reception of an input keyword from the user;
transmit the response content or the return question keyword to the user for holding a dialogue; and
urge the user to make an additional input associated with the dialogue, wherein the unnecessary keyword cannot narrow down a search result even if a reply question is asked for each of the plurality of keywords associated with the response content.

2. The dialogue server according to claim 1, wherein the response content is able to be uniquely judged in the truth table in which one or a plurality of keywords of the extracted keywords are removed as unnecessary keywords.

3. The dialogue server according to claim 2, wherein the processing circuitry determines whether or not one or more of the plurality of extracted keywords are removal targets based on a degree of importance thereof and generates the truth table.

4. The dialogue server according to claim 1, wherein the processing circuitry determines whether or not one or more of the plurality of extracted keywords are removal targets based on a degree of importance thereof and generates the truth table.

5. The dialogue server according to claim 1, wherein the processing circuitry generates the truth table in which a similar keyword, of the plurality of extracted keywords, similar to the unnecessary keyword based on the predetermined condition is further removed.

6. The dialogue server according to claim 1, wherein the memory is configured to store a keyword input by the user as historical information, and wherein the processing circuitry generates a new truth table in which a keyword, of the keywords listed in the truth table, not included in the historical information is removed as the unnecessary keyword.

7. The dialogue server according to claim 1, wherein the memory is configured to store a keyword for urging the user to make the additional input and an affirmative sign indicating that the user is affirmative or a negative sign indicating that the user is negative with respect to the keyword as historical information, and
wherein the processing circuitry generates a new truth table in which a keyword, of the keywords listed in the truth table, satisfying the predetermined condition with an intention of the user is removed as the unnecessary keyword based on the affirmative sign or negative sign.

8. The dialogue server according to claim 1, wherein the processing circuitry is configured to generate an unnecessary key list including candidates for the unnecessary keyword based on the predetermined condition from the plurality of extracted keywords, and wherein the processing circuitry generates the truth table on the basis of the unnecessary key list.

\* \* \* \* \*